3,442,604
STABILIZED PHOSPHATE AND DENTIFRICE COMPOSITIONS AND PROCESS FOR PRODUCING SAME
Raymond Anthony Smith, Walsall, and John Thomas Dixon, Smethwick, England, assignors to Albright & Wilson (Mfg.) Limited, Oldbury, Warwickshire, England, a British company
No Drawing. Filed Apr. 25, 1967, Ser. No. 633,431
Claims priority, application Great Britain, May 18, 1966, 22,202/66; Aug. 2, 1966, 34,624/66
Int. Cl. C01b 25/32
U.S. Cl. 23—108                    10 Claims

ABSTRACT OF THE DISCLOSURE

Phosphate salts of metal of group II of the periodic table, especially alkaline-earth metal salts such as dicalcium phosphate, are stabilized against hydrolysis by the incorporation therein of a phosphonic acid of the general formula Z—PO(OM)$_2$ wherein Z is a (MO)$_2$OP·CRX· or R$_1$R$_2$N·CR$_3$R$_4$· wherein R is an alkyl group containing up to 11 carbon atoms and X is an OH or NH$_2$ group; R$_1$, R$_2$, R$_3$ and R$_4$ are each hydrogen or alkyl groups and may be the same or different, or R$_1$ and/or R$_2$ may be —CR$_3$R$_4$·PO(OH)$_2$ or alkyl ether groups; and M is a hydrogen.

---

The present invention relates to the stabilization of phosphate salts of group II metal salts and to compositions containing such salts, particularly dentifrice compositions.

Dentifrice compositions, for example toothpastes or tooth powders, contain, inter alia, dicalcium phosphate which acts as a polishing agent. In many cases the compositions also contain other ingredients which cause the calcium phosphate present therein to hydrolyze, yielding acidic products. These acidic products in time cause the compositions to solidify, thus rendering them unfit for use, this problem being aggravated in tropical climates where the compositions are subjected to high ambient temperatures. Furthermore, the acidic products also react with any carbonate material present in the composition to yield carbon dioxide which may generate sufficient pressure within the dentifrice container to cause this to explode. It has therefore been customary to stabilize the calcium phosphate present in dentifrice compositions and thereby prevent its hydrolysis. This stabilization has usually been achieved by the addition of such materials as pyrophosphoric acid, sodium pyrophosphate or sodium calcium pyrophosphate to a slurry of dicalcium phosphate in water. The slurry has then been filtered and the calcium phosphate incorporated into the dentifrice composition. It has also been proposed to dry mix calcium phosphate with trimagnesium orthophosphate. Although each of these methods usually effect satisfactory stabilization of the calcium phosphate, each suffers from some disadvantage in that: where pyrophosphoric acid is used the stabilization is not constant since it is difficult to obtain an acid of consistent strength and because it is difficult to handle the acid; where salts of pyrophosphoric acid are used, it is necessary to incubate the treated dicalcium phosphate at 60° C. for about an hour to ensure adequate stabilization; and where magnesium phosphates are used, the dry mixing technique is inconvenient. We have now found that if, in place of part or all of the commonly used stabilizing agents, there are used certain phosphonic acids or salts thereof, effective and uniform stabilization of the phosphate material in the dentifrice composition may be achieved. Furthermore, we have found that it is not necessary to use such large amounts of stabilizing agents as has been the case with those used hitherto.

Although the present invention is of especial application in the stabilization of dentifrice formulations containing alkaline earth metal phosphate salts, the discovery upon which it is based is not limited to such applications, but also enables phosphate salts of group II metals, such as magnesium, strontium, barium or zinc, destined for a variety of uses to be stored for prolonged periods prior to use.

Accordingly, the present invention provides a process for the stabilization of phosphate salts of the metals of group II of the periodic table against hydrolysis which comprises adding thereto a phosphonic acid of the general formula:

I 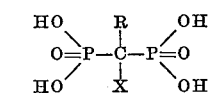

wherein R is an alkyl group containing up to 11 carbon atoms and X is an OH or NH$_2$ group, or a salt thereof; or of the general formula:

II 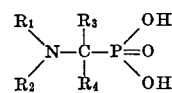

wherein R$_1$, R$_2$, R$_3$, and R$_4$ are each hydrogen or alkyl groups and may be the same or different, or R$_1$ and/or R$_2$ may be

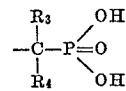

or alkyl ether groups; or a salt thereof.

The phosphonic acids of Formula I for present use include those wherein that the R groups is a lower alkyl group such as a methyl, ethyl, propyl or butyl group, especially a methyl group. A particularly preferred acid is that wherein the R group is a methyl group and X is an OH group.

The phosphonic acids of Formula I for present use may be readily prepared by the reaction of phosphorous acid or phosphorus trichloride with an acylating agent and then steam distilling the product. An especially preferred method for preparing 1, hydroxyethylidene diphosphonic acid is that wherein phosphorus trichloride is reacted with an excess of glacial acetic acid and the reaction mixture steam distilled.

The phosphonic acids of Formula II for present use include those wherein the R groups are lower alkyl groups such as methyl, ethyl, propyl or butyl groups, though the R$_1$ and R$_2$ groups may also be long chain alkyl groups containing ether linkages. However, it is preferred that the R$_3$ and R$_4$ groups be hydrogen and that the R$_1$ and R$_2$ groups are each

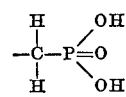

groups.

The phosphonic acids of the preferred structure of Formula II may be readily prepared by reacting ammonia, or a primary or secondary amine, with phosphorous acid and aldehyde or ketone. An especially preferred method for preparing the phosphonic acids for present use is that described and claimed in U.K specification No. 1,023,785.

As indicated below, it is preferred to use the salts of the phosphonic acids, for example the sodium and/or calcium salts of the above acids, though salts containing different cations and mixtures of different salts may be employed if desired. It is preferred that the salts employed be water-soluble.

The phosphate salts to which the invention is applicable are those of the metals of group II of the periodic table. The invention is of especial use in the stabilization of the alkaline-earth metal salts, notably the calcium phosphate salts. The term phosphate salt is used herein to denote the salts of orthophosphoric acid.

The amount of the phosphonic acid stabilizer which is to be added to a composition containing the phosphate salts will depend upon the extent of stabilization required, the phosphate salt content and the amount, if any, of other stabilizing agents which may be present. The amount required to secure stabilization is also dependant upon the conditions under which the composition is to be stored or used and may be affected by other ingredients in the composition. The precise amount required may be readily ascertained by simple trial and error. However, we have found that, in general, the use of from 0.5 to 5% preferably from 0.5 to 1% by weight of the phosphonic acid stabilizers based on the amount of phosphate salt present is satisfactory if no other stabilizer is present. The stabilizers of the invention may be incorporated into the compositions at any time during their preparation. However, in order to achieve satisfactory stabilization with the minimum amount of stabilizer it is preferred to add the stabilizer of the invention to the slurry of the phosphate salt in the manner used with the prior art stabilization of dicalcium phosphate.

As indicated above, the phosphonic acids of the invention may be used in conjunction with the stabilizers used hitherto. Where mixtures of stabilizers are employed, the amount of phosphonic acid present therein is preferably not less than 30% by weight of the mixture. The total amount of mixture employed will vary with the nature of the conventional stabilizer used. However, sufficient of the mixture to provide from 0.1% to 5% by weight based on th phosphate salt of the phosphonic acid is usually required.

Dentifrice compositions are desirably substantially neutral, i.e., they have a pH value of about 7, and it is therefore desirable to use salts of the phosphonic acids as stabilizers. However, in some cases it may be desired to use the free phosphonic acids and to adjust the pH of the treated slurry of phosphate salt by the addition of lime or magnesium oxide thereto. Since it is possible to achieve stabilization with only very small amounts of phosphonic acids of the invention, the adjustment of the pH is usually not necessary, for the addition of the stabilizer to the phosphate salt does not alter the pH of the slurry to any appreciable extent.

The dentifrice compositions may contain, in addition to the stabilizers and phosphate salts specified above, conventional ingredients such as flavors, emulsifiers, fillers and bacteriocides. Since mixtures of acid stabilizers be used, as indicated above, and since the phosphonic stabilizers acid of the invention may be added at any point in the praparation of the dentifrice composition, it is possible to recover batches of stabilized dentifrice composition, to which an insufficient amount of a conventional stabilizer has been added, by the incorporation of the required amount of a phosphoric acid of the invention therein. The insufficiently stabilized compositions have hitherto not been recovered but have had to be used elsewhere or discarded. The invention therefore permits considerable commercial saving in the production of dentifrice compositions.

Although the invention is directed mainly to the stabilization of dentifrice formulations, which usually contain dicalcium phosphate, the stabilization of other compositions containing phosphate salts which are to be stored for prolonged periods prior to use, or are destined for other uses may be achieved in substantially the same manner. In such cases there may be no reason for ensuring that the compositions are substantially neutral. The phosphate salts contained in such other compositions need not be calcium salts, but may be, for example, barium, strontium, or zinc or magnesium salts.

The invention will now be illustrated in the following examples in which all parts and percentages are given by weight.

EXAMPLE 1

A known amount of 1.75 S.G. orthophosphoric acid was diluted with water to a specific gravity of about 1.2 gm./cc. A slurry of milk of lime containing about 18% w./w. $Ca(OH)_2$ was added with rapid stirring to the acid at such a rate as to maintain the temperature at $40\pm5°$ C. The reaction was continued until the pH value of the slurry was about 7.0. At this point 1% w./w., based on the weight of the dicalcium phosphate dihydrate, of amino-tris(methylene phosphonic) acid was added to the slurry. The pH of the slurry was readjusted to about 7 by adding more milk of lime and the dicalcium phosphate dihydrate was separated by filtration, dried and milled.

EXAMPLE 2

Dicalcium phosphate dihydrate was prepared under conditions described in Example 1, except that the lime slurry was added until the pH reached approximately 8. At this point 2% w./w., based on the weight of dicalcium phosphate dihydrate, of amino-tris(methylene phosphonic) acid was added and the slurry was allowed to equilibrate for fifteen minutes. The dicalcium phosphate dihydrate was removed by filtration, dried and milled.

EXAMPLE 3

Dicalcium phosphate dihydrate was prepared by adding milk of lime slurry to phosphoric acid as in Example 1. When the pH of the slurry was 7 the dicalcium phosphate dihydrate was separated by filtration, dried and milled. 5% w./w. of the dicalcium salt of amino-tris (methylene phosphonic) acid was added to the dicalcium phosphate dihydrate. The two salts were mechanically mixed and milled to a size suitable for dentifrice compositions.

EXAMPLE 4

Examples 1, 2 and 3 were repeated using 1 hydroxyethylidene diphosphonic acid in place of the amino-tris (methylene phosphonic) acid advocated. The amounts used were 1%, 2% and 1% (as the monocalcium salt) respectively. Example 1 was also repeated using 1.5% of the disodium salt of 1, hydroxyethylidene diphosphonic acid.

EXAMPLE 5

The stabilities of the dicalcium phosphate dihydrates prepared in Examples 1, 2, 3 and 4 were determined in glycerine-water solutions as follows: Dicalcium phosphase dihydrate (25 gm.) was placed in a 100 ml. beaker and a glycerine-water mixture (80% w./w. glycerine-20% w./w. water) added until a thin paste was formed. The paste was then poured into a "Pyrox" test tube and the tube and contents suspended in boiling water 30 minutes. The paste was then examined and found to be mobile and free from lumps. Similar treatment of an unstabilized dicalcium phosphate dihydrate produces an almost solid putty.

EXAMPLE 6

A further stability test was carried out as follows: The dicalcium phosphate dihydrate, made in Examples 1, 2 and 3 was placed in shallow dishes, and incubated in a humidity cabinet at 60° C. with a relative humidity of 75% for 1 to 20 days. The amount of dehydration was determined by loss on ignition after drying in a calcium chloride desiccator for 1 hour. The weight percent conversion to the anhydrous salt was calculated by comparison with the original sample. There was 5 to 8 percent of the anhydrous salt present in the calcium phosphate dihydrate as stabilized in Examples 1, 2 and 3 after 20 days, whereas unstabilized dicalcium phosphate dihydrate contained 38 to 45 percent anhydrous salt present after 20 days.

We claim:

1. The process for stabilizing at least one phosphate selected from the group consisting of calcium phosphate, strontium phosphate, barium phosphate, zinc phosphate and magnesium phosphate, comprising admixing therewith between about 0.5% and 1% by weight of at least one stabilizer selected from phosphonic acids of the formula

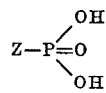

wherein Z is selected from

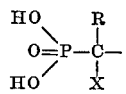

and

groups, wherein R is an alkyl group containing up to 11 carbon atoms, X is an OH or $NH_2$ group, $R_1$ and $R_2$ are each selected from hydrogen, alkyl, alkyl ether, and

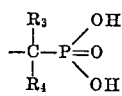

groups, and $R_3$ and $R_4$ are each selected from hydrogen and alkyl groups; and water soluble salts of said phosphonic acids, to inhibit hydrolysis of said phosphate.

2. The process of claim 1 wherein said stabilizer is a phosphonic acid having the formula

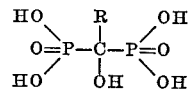

wherein R is a methyl, ethyl, propyl, or butyl group.

3. The process of claim 1 wherein said stabilizer is a phosphonic acid having the formula

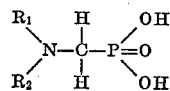

wherein $R_1$ and $R_2$ are each selected from hydrogen, alkyl and

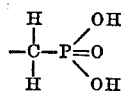

groups.

4. A process according to claim 1 wherein said stabilizer is incorporated during the preparation of the phosphate salt, into the reaction mixture.

5. A process according to claim 1 wherein the amount of said stabilizer is from 0.5 to 1%.

6. The process of claim 5 wherein said phosphate is calcium phosphate and wherein said stabilizer is amino-tris(methylene phosphonic) acid, the dicalcium salt of amino-tris(methylene phosphonic) acid, or hydroxyethylidene diphosphonic acid.

7. In compositions containing at least one phosphate selected from the group consisting of calcium phosphate, strontium phosphate, barium phosphate, zinc phosphate and magnesium phosphate, and between 0.5% and 5% based upon the weight of said phosphate, of a stabilizer to inhibit the hydrolysis of said phosphate the improvement which comprises that at least 30% of said stabilizer should be selected from phosphonic acids of the formula

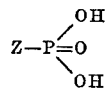

wherein Z is selected from

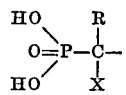

and

groups, wherein R is an alkyl group containing up to 11 carbon atoms, X is an OH or $NH_2$ group, $R_1$ and $R_2$ are each selected from hydrogen, alkyl, alkyl ether, and

groups, and $R_3$ and $R_4$ are each selected from hydrogen and alkyl groups; and water soluble salts of said phosphonic acids.

8. The composition of claim 7 containing at least one dentifrice component selected from the group consisting of flavours, emulsifiers, fillers and bacteriocides and being substantially neutral.

9. The composition of claim 8 wherein said metal phosphate is calcium phosphate, and wherein said composition contains between about 0.5% and 1% by weight of said phosphonic acid or water soluble salt thereof based on the weight of said calcium phosphate.

10. The composition of claim 7, 8, or 9 wherein said phosphonic acid and water soluble salts thereof is amino-tris(methylene phosphonic) acid, the dicalcium salt of amino-tris(methylene phosphonic) acid, or hydroxyethylidene diphosphonic acid.

References Cited

UNITED STATES PATENTS

| | | | |
|---|---|---|---|
| 2,128,161 | 8/1938 | Morgan | 166—21 |
| 2,928,728 | 3/1960 | Weeks | 71—43 |
| 3,057,711 | 10/1962 | Reusser et al. | 71—43 |
| 3,118,730 | 1/1964 | Nickerson | 23—165 |
| 3,259,458 | 7/1966 | Peterson et al. | 23—165 |

OSCAR R. VERTIZ, *Primary Examiner.*

LUTHER A. MARSH, *Assistant Examiner.*

U.S. Cl. X.R.

424—57